United States Patent [19]
Arroyo

[11] Patent Number: 5,305,410
[45] Date of Patent: Apr. 19, 1994

[54] DIELECTRIC OPTICAL FIBER CABLES WHICH ARE MAGNETICALLY LOCATABLE

[75] Inventor: Candido J. Arroyo, Lithonia, Ga.

[73] Assignee: AT&T Bell Laboratories, Murray Hill, N.J.

[21] Appl. No.: 12,357

[22] Filed: Feb. 2, 1993

[51] Int. Cl.$^5$ .............................................. G02B 6/44
[52] U.S. Cl. ..................................... 385/109; 385/100
[58] Field of Search ............................... 385/100–114, 385/123–128

[56] References Cited

U.S. PATENT DOCUMENTS

| | | | |
|---|---|---|---|
| 4,407,561 | 10/1983 | Wysocki | 385/128 |
| 4,678,273 | 7/1987 | Vilhelmsson | 385/128 |
| 4,701,014 | 10/1987 | Gartside et al. | 350/96.23 |
| 4,874,219 | 10/1989 | Arroyo et al. | 350/96.23 |
| 5,006,806 | 4/1991 | Rippingale et al. | 324/326 |
| 5,017,873 | 5/1991 | Rippingale et al. | 324/326 |
| 5,189,718 | 2/1993 | Barrett et al. | 385/100 |

Primary Examiner—Rodney B. Bovernick
Assistant Examiner—John Ngo
Attorney, Agent, or Firm—Donald E. Hayes, Jr.

[57] ABSTRACT

The present invention provides a dielectric optical fiber cable which is capable of being remotely detected while buried. Specifically, this invention incorporates magnetic materials into existing superabsorbent tapes which are commonly used to provide water-blocking capabilities in nearly all optical fiber cables. One embodiment of the present invention includes a tape which has been treated with a blend of neodymium iron boron and superabsorbent powders.

11 Claims, 4 Drawing Sheets

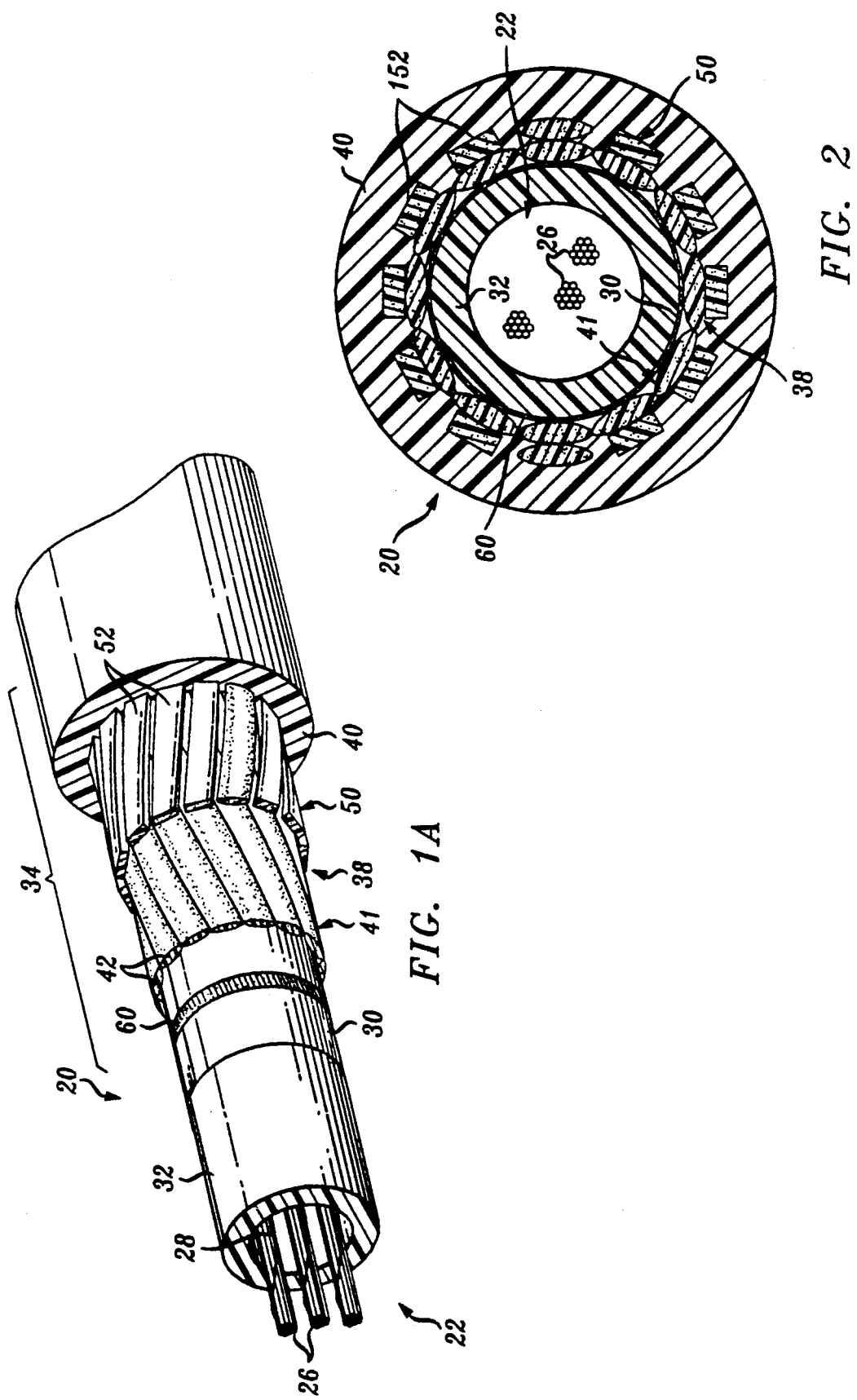

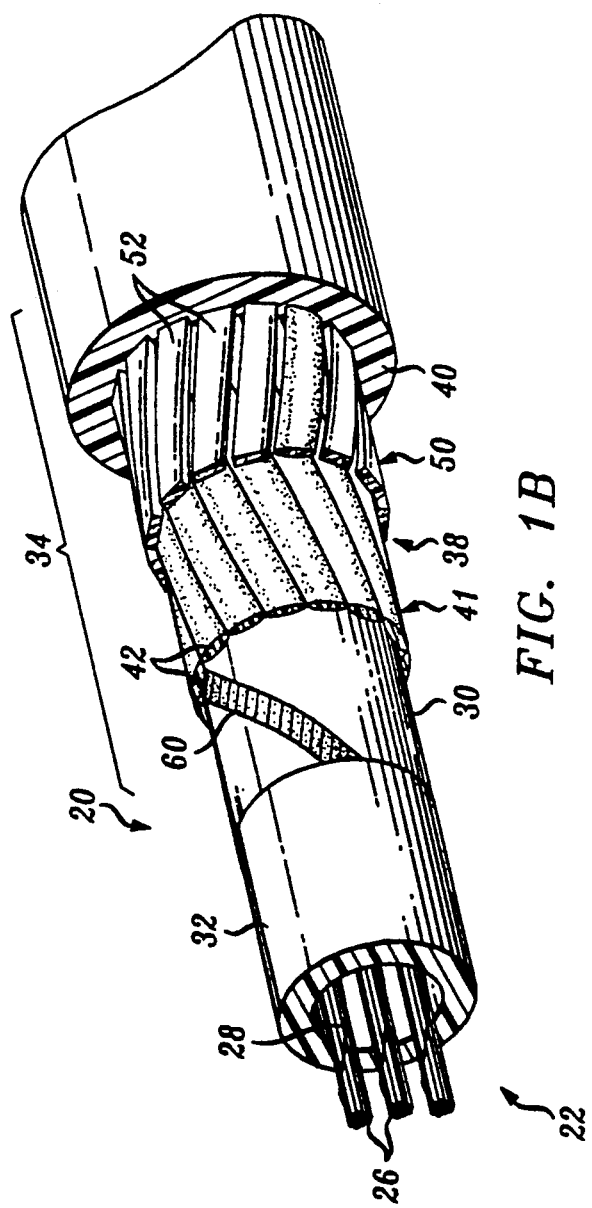

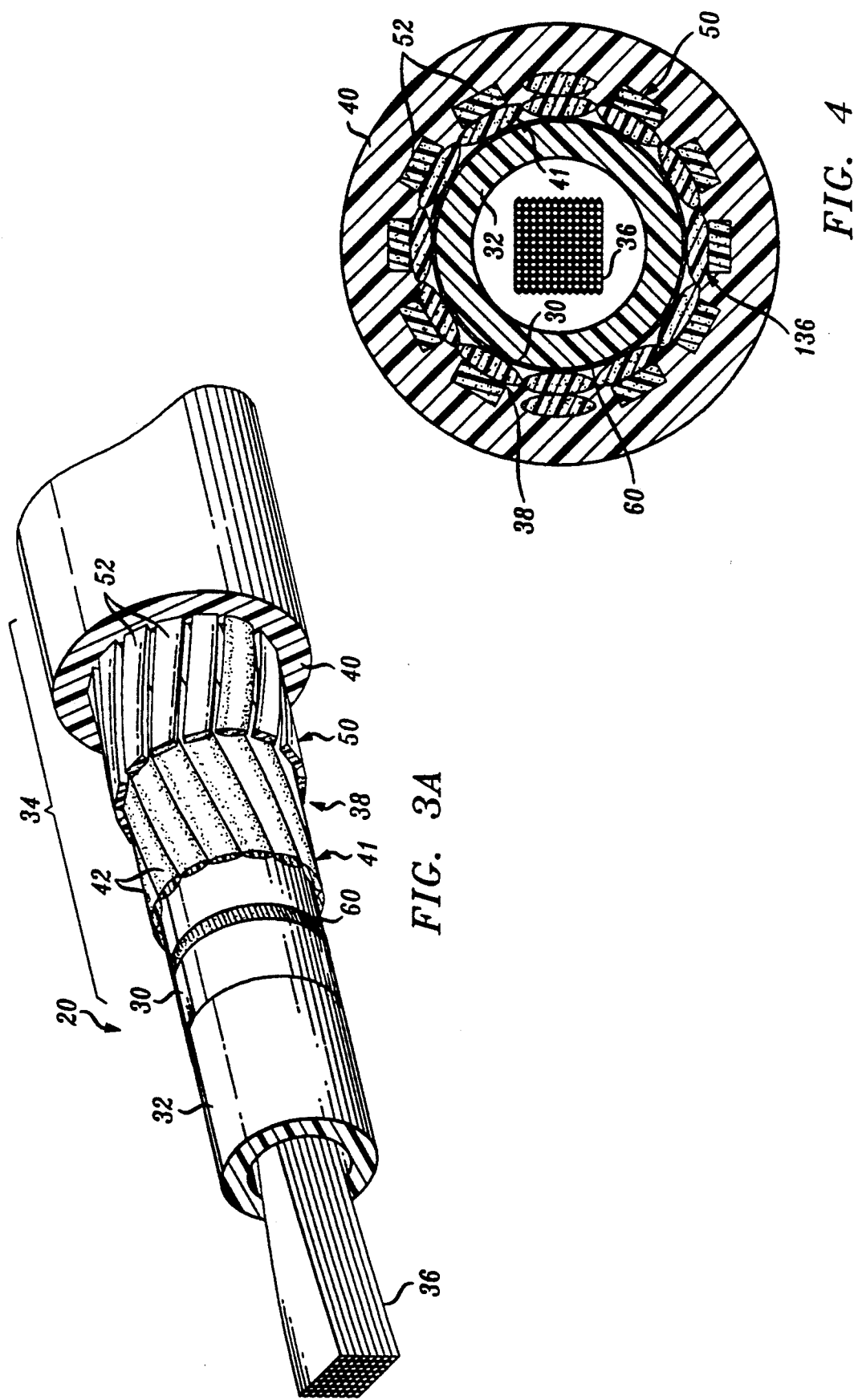

DIELECTRIC OPTICAL FIBER CABLES WHICH ARE MAGNETICALLY LOCATABLE

TECHNICAL FIELD

This invention relates to dielectric optical fiber cables which are magnetically locatable. More particularly, the cables incorporate a substrate or tape as the single carrier for a blend of magnetic particles and superabsorbent powders, thereby establishing a magnetically locatable cable.

BACKGROUND OF THE INVENTION

The two basic types of optical fiber cables presently used in the industry are metallic cables and dielectric (or non-metallic) cables. At present, it is believed that slightly less than one-third of telecommunication systems used dielectric fiber optic cable. However, approximately half of those using metallic cables have indicted through surveys that they would use dielectric cables instead if there existed a reliable and cost-effective method to locate the dielectric cable after it has been buried.

Presently, there are basically two general types of technologies involved in the detection of buried fiber optic cable, magnetic and metallic. In general, the existing magnetic locators consist of either 1) magnetic elements designed or embedded into the cable, or 2) a magnetic-field emitting product which is buried alongside the length of the cable. The residual magnetization generated by the past magnetic hysteresis of the cable may then be detected by a magnetic locator. However, the distribution pattern of the magnetic field often varies according to the cable and its particular position along the cable and thus, it is difficult to detect the correct cable when other magnetic members are located nearby.

Alternatively, existing metallic fiber optic cable locators generally use a detection method based on the electromagnetic field produced by the application of an alternating current to the metallic sheathed cable. However, the electric and/or magnetic field generated by the application of an AC electric signal to the cable is often not strong enough to allow a determination of the precise location of the cable. Such low levels of field strength are particularly ineffective in locating cables buried deep under the ground or seal bed.

Commonly, to facilitate detecting a dielectric cable, a copper ground wire is positioned just above the cable. However, the exposed nature of this ground wire makes it very vulnerable to lightning strikes. Furthermore, when a cable's armor or detection wire is severed by lightning or some other cause, it becomes impossible to apply an electric signal along the cable, thus creating great difficulty in locating and retrieving the cable for repair.

Other existing detection methods include incorporating a nonconductive tape which has been covered with a magnetic powder such as strontium or barium ferrite or compounding and extruding these magnetic powders in polyethylene or polyvinyl chloride conduits. Both of these methods employ a means of magnetizing a tape and helically wrapping it along the length of the cable or magnetizing a strip along the length of the conduit. Each method also provides a distinctive electronic-detection signature which allows an operator to differentiate between a buried cable and a solid metallic pipe. See U.S. Pat. Nos. 5,006,806 and 5,017,873 which are assigned to Schondstedt Instrumentation Company of Reston, VA.

What is needed and seemingly not available in the prior art is a system which dependably, accurately and cost-effectively locates dielectric (non-metallic) buried cables. Also desirable is a system for locating buried dielectric cables which is readily adaptable to most, if not all, existing cable types. One preferred method involves modifying the existing water-blocking tape present in the cable so that the cable becomes magnetically locatable without adversely affecting the operational characteristics of the cable.

SUMMARY OF THE INVENTION

The foregoing problems of the prior art having been overcome with the cable of this invention. The present invention provides a dielectric optical fiber cable which is capable of being remotely detected while buried. Specifically, this invention incorporates magnetic materials into existing superabsorbent tapes which are commonly used to provide water-blocking capabilities in nearly all optical fiber cables. One embodiment of the present invention includes a tape which has been treated with a blend of neodymium iron boron and superabsorbent powders.

BRIEF DESCRIPTION OF THE DRAWING

Other features of the present invention will be more readily understood from the following detailed description of specific embodiments thereof when read in conjunction with the accompanying drawings, in which:

FIG. 1A is a perspective view of a communications cable having a sheath system which includes one configuration of magnetically locatable, water-blocking provision with layers of the sheath system broken away and some of the layers exaggerated in thickness for purposes of clarity;

FIG. 1B is a perspective view of a communications cable having a sheath system which includes an alternative configuration of magnetically locatable, water-blocking provisions with layers of the sheath system broken away and some of the layers exaggerated in thickness for purposes of clarity;

FIG. 2 is an end sectional view of the cables of FIGS. 1A and 1B;

FIG. 3A and 3B are perspective views of another communications cable arrangement in accordance with this invention; and FIG. 4 is an end sectional view of the cables of FIGS. 3A and 3B.

DETAILED DESCRIPTION

Figure 3B:
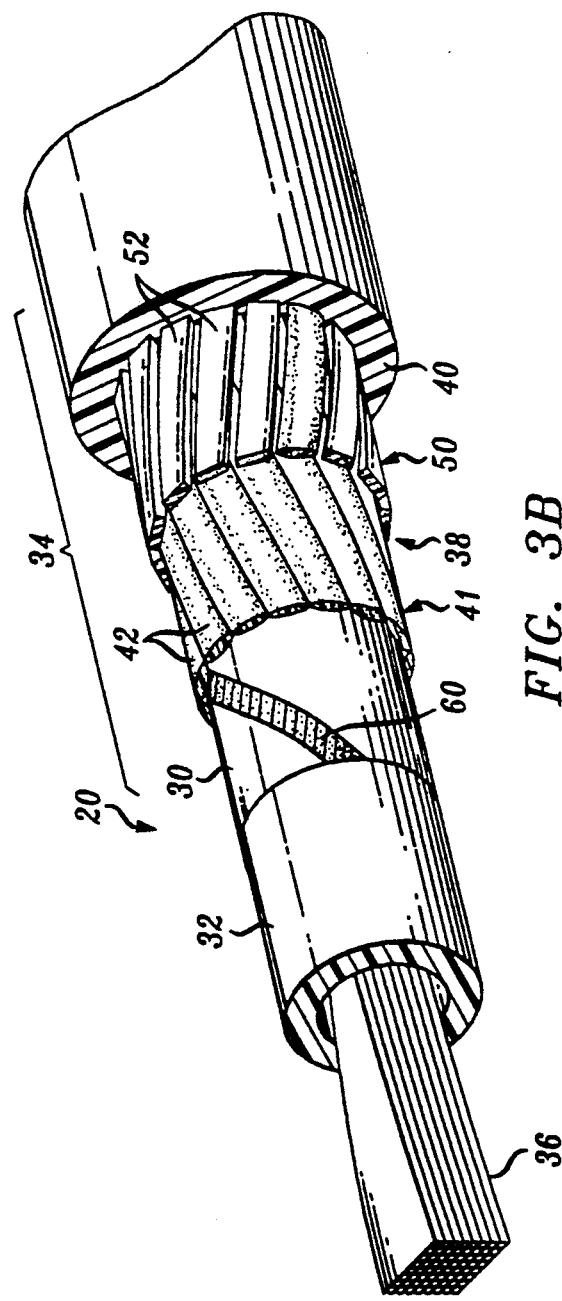

Referring now to FIGS. 1 through 4, there is shown a communications cable which is designated generally with the numeral 20. It includes a core 22 comprising one or more units 24-24 of optical fibers 26-26 which may be buffered with an outer layer of polyvinyl chloride (PVC), for example. Each of the units 24-24 is wrapped with a binder ribbon 28. The core 22 includes a water-blocking member 30 which is disposed about a tubular member 32 referred to as a core tube of a sheath system 34. In the embodiments shown in FIGS. 1A and 1B, the water-blocking member 30 is tubular and disposed adjacent to the core tube 32 which surrounds optical fibers 26-26. However, the core 22 could just as well include a plurality of optical fiber ribbons 36-36 (see FIGS. 4A, 4B, and 5).

The water-blocking member 30 is in the form of a tape which may comprise a substrate tape which may be made of a hydrophobic material and which has been treated with a suitable material. A hydrophilic material is one that has a strong affinity for water in that it absorbs water easily. As can be seen, the tape 30 has been wrapped about the units 24-24 in a manner which may or may not include an overlapped seam.

The sheath system 34 includes the water-blocking tape 30, a strength system 38 and an outer plastic jacket 40. The strength system 38 includes an inner first layer 41 of relatively flexible strength members 42-42 which are in engagement with the tape 30. Each of the strength members 42-42 comprises a glass fiber member such as a glass roving or yarn. In a preferred embodiment, each of the strength members 42-42 is a glass roving and is wrapped helically about the tape 30. Each roving is characterized by a load-carrying capability intention of about 88 lbs. per 1 percent strain. The load per unit strain is commonly defined as stiffness.

Another component of the strength system is an outer layer 50 of strength members which are in engagement with the strength members 42-42 of the inner layer 40. As shown, outer strength layer 50 includes individual strength members 52-52 which comprises a relatively inflexible rod-like member is made of glass fibers in the form of a yarn or roving. Such glass rods are available commercially from the Air Logistics Corp. Under the designation E-glass tape. For the preferred embodiment, the strength members 52-52 of the outer layer are wrapped helically about the strength members 42-42 of the inner layer but in an opposite helical direction from those of the inner layer. However, the individual strength members of strength system 38 may be assembled to the cable without stranding.

In one embodiment, the tape 30 is comprised of a non-cellulosic material such as a spunbonded non-woven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material which has the capability of maintaining its shape in the presence of the temperatures encountered during the extrusion of the core tube 32. The fibers of the web structure are arranged so that air cells or pockets are formed.

A polyethylene terephthalate fiber product, formed into a web structure as described above has been identified under the registered trademark "Reemay" by Reemay, Inc., of Old Hickory, Tenn. Presently, the Reemay° web structure is available in various thicknesses and densities. The properties of Reemay tapes are further defined and described in Bulletin R-1, dated March, 1986, entitled "Properties and Processing of Reemay Spunbonded Polyester" from E. I. duPont de Nemours and Company, Incorporated, Wilmington, Del.

Although in a preferred embodiment, a spunbonded polyester tape is used, others also are acceptable. For example, the tape which is to be laminated may be a nylon spunbonded fabric, non-woven glass, polypropylene melt blown non-woven fabric, polyurethane spunbonded fabric or TCF cellulose fabric, for example.

In a preferred embodiment, the spunbonded polyester tape 30 combines the thermal, chemical and mechanical properties of polyester fibers with a spunbonded structure to provide a tape which is suitable for use in a communication cable. These properties include a relatively high tensile strength and elongation, excellent tear strength, and resistance to temperatures as high as about 400° F.

The present invention identifies and utilizes three basic parameters which collectively establish the effectiveness of magnetic cablelocating systems. Generally, magnetic detection depends on the following:

1) selecting the proper magnetic material (permanent or soft magnet) 2) determining the optimum magnetic marking or orientation on the cable (magnetize the tape along its width, thickness or length), and 3) selecting a reliable detection device. More specifically, the present invention utilizes these parameters to select and orient particular magnetic material to optimize their comparability with existing superabsorbent materials so that synergistically function on a single carrier tape.

With regard to the first parameter involving the selection of the most appropriate type of magnetic material, the distinguishing operational factors of both permanent magnetic materials and soft magnetic materials should be compared. In general, permanent magnets are passive devices in which electromechanical energy has initially been stored by a large aligning magnetic field. Therefore, permanent magnets are the preferred type of magnetic material for use within a communications cable since they require no externally applied current or force to maintain their magnetic chcaracteristics.

However, it should be noted that while permanent magnetic materials are used in the preferred embodiment, soft magnetic materials may be used in accordance with the present invention within applications where the soft magnetic materials may be conveniently magnetized, such as through induction, in the presence of a stronger field of detection. Nickel zinc ferrite is a soft magnetic material commonly used throughout industry.

The second factor relates to the selection of the most appropriate marking or orientation of the magnetic materials. It is known to orient magnetic materials both along the width and length of a substrate. The preferred embodiment of the present invention is to orient the magnetic materials lengthwise along the substrate since tests have indicated such orientation produces the best results. However, orienting the magnetic materials along the width of the substrate may also be acceptable in accordance with the present invention.

While a third factor identifies the detection unit as an important point of concern for the overall detection system, it should be noted that any well known detection unit may be used in accordance with the present invention.

In accordance with the present invention, three particular permanent magnetic powders have been tested and identified as being sufficiently compatible with existing superabsorbent powders to provide a tape which is both magnetically locatable and yet maintains adequate water-blocking properties. Specifically, neodymium iron boron, as well as strontium and barium ferrite, are acceptable as the permanent magnet materials of this invention.

In the preferred embodiment of the present invention, neodymium iron boron is used as the magnetic material due to the much higher energy it produces. Furthermore, even though neodymium iron boron exhibits a relatively high rate of oxidation, tests show that when blended with a superabsorbent powder, the oxidation rate of the neodymium iron boron is actually reduced. Neodymium iron boron can also be encapsulated to further control oxidation.

Strontium and barium ferrite powders may be obtained from the D. M. Steward Manufacturing Company of Chattanooga, Tenn. The neodymium iron boron powder may be obtained from Magnaquench Delco Remy, a division of General Motors of Anderson, Ind. Specification for each of these powders are readily available from the appropriate manufacturer.

As stated earlier, the magnetic material should be oriented along the length of the cable such that the electronic-detection signature generated by the cable is readily distinguishable from that of a solid magnetic pipe. In order to achieve this, the magnetic material 60 may be concentrically dispensed at periodic intervals along the length of substrate 30. Such a longitudinally spacial orientation of the magnetic materials is illustrated in the cable of FIG. 1A. Yet another manner in which the magnetic material 60 may be positioned along the substrate 30, is to dispense a continuous longitudinal strip of the magnetic material 60 along the entire length of the substrate. To achieve the desired detection signal, the treated substrate may be positioned within the cable such that the strip of magnetic material 60 helically encircles the cable core 32. The cable of FIG. 1B illustrates this continuous and helical alignment of the magnetic material 60.

In order to render the substrate tape swellable upon contact with moisture, the carrier tape 30 is impregnated with a suitable waterswellable material which herein is referred to as a superabsorbent material. Suitable superabsorbent powders which may be laminated between two coated Reemay tapes include one marketed by the Stockhausen Company under the designation Stockhausen FAVOR SAB 800 HS powder and one manufactured by Sumitomo Electric Company under the designation Sumitomo J550.

Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held November 16-17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyarcylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes—polyacrylic acid superabsorbents, polymaleic anhydride-vinyl monomer superabsorbetns, polyacrylonitrile-based superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

Advantageously, the tape 30 of this invention also acts as a thermal barrier not only during the extrusion of the core tube 32 but also during the extrusion of the jacket 40. As the jacket 40 is extruded over the tape 30, heat is available for transfer into the optical fiber core. The tape 30 of the cable 20 has the ability to insulate against the heat caused by the extrusion of the core tube and the jacket.

Another important characteristics of the substrate tape is the stiffness of the body of the material which comprises the tape. Within limits, as the material of the substrate tape is made increasingly stiffer, it is still relatively easy to form the tape longitudinally. As a desirable consequence, a minimum overall diameter is achieved for the cable which will meet all the necessary requirements. Stiffness of the material for the substrate tape is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to increase the ability of the material to delay heat transfer. At least four factors, formability of the tape 30, cost of the tape, insulative capability of the tape, and its water-blocking capability must be considered and balanced in providing the proper material for use in a particular cable.

Tests have been conducted for a plurality of water-blocking members, each comprising two substrate tapes having both a magnetic powder and a superabsorbent powder laminated therebetween. The test conducted measured the effect that varying either the distance between the magnetic detection device and the magnetic materials or the particular environment located therebetween. The powder mixture tested comprises a mixture of a magnetic material and a superabsorbent material having a 4:1 ratio of a magnetic material to superabsorbent material. However, it should be noted that the particular ratio of materials used may be varied depending upon the particular needs of that application.

Each of the tapes also may be provided with resistance to microbial growth. Non-cellulosic tapes are used and the superabsorbent materials are microbial resistant. See U.S. Pat. No. 5,138,685 issued on Aug. 11, 1992, in the name of C. J. Arroyo which is a continuation of U.S. Pat. No. 5,020,875 issued on Jun. 4, 1991, and which are incorporated by reference hereinto.

Although the tapes thus far have been polyester nonwoven tapes, it also is possible to laminate between two tapes which are wood pulp derivatives. These perform equally as well as the others described except that fungus growth is experienced. In order to deal with the fungus growth, such cellulosic tapes are treated with antimicrobial resistant material such as Intersept antimicrobial resistant material as marketed by Interface Research Corporation or TK100 material which is marketed by Calgon Corporation.

It is to be understood that the above-described arrangements are simply illustrative of the invention. Other arrangement may be devised by those skilled in the art which will embody the principles of the invention and fall within the spirit and scope thereof.

I claim:

1. An optical fiber cable, which includes:
   a core comprising at least one optical fiber transmission medium;
   a tubular member in which is disposed said core and which is made of a plastic material;
   a sheath system which is disposed about said tubular member; and
   means disposed about said tubular member for blocking the longitudinal flow of water and including means of which the location can be detected magnetically therein and wherein the means of which the location can be detected magnetically generates a detection signal which is distinguishable from that generated by a solid metallic pipe.

2. The cable of claim 1, wherein said means disposed about said tubular member includes a longitudinally extending laminate comprising two substrate tapes having a powder mixture therebetween.

3. The cable of claim 2 wherein said powder mixture includes a mixture of superabsorbent material and a magnetic material.

4. The cable of claim 3, wherein said superabsorbent material is a powder.

5. The cable of claim 3, wherein said magnetic material is a powder.

6. The cable of claim 3, wherein the magnetic material is concentrically disposed with longitudinal spacing along the length of the water-blocking, magnetically locatable means.

7. The cable of claim 3, wherein the magnetic material is disposed in a longitudinal strip along the length of the water-blocking said means of which the location can be detected magnetically which is then helically wrapped about the tubular member.

8. The cable of claim 1, wherein said magnetic material is selected from the group consisting of strontium ferrite, barium ferrite, and neodymium iron boron.

9. The cable of claim 1, wherein said means disposed about said tubular member is microbial resistant.

10. The cable of claim 1, wherein said means disposed about said tubular member comprises two longitudinally extending tapes, each comprising a non-cellulosic material.

11. The cable of claim 1, wherein said means disposed about said tubular member comprises two longitudinally extending cellulosic based tapes, each having been treated with a microbial resistant material.

* * * * *